UNITED STATES PATENT OFFICE.

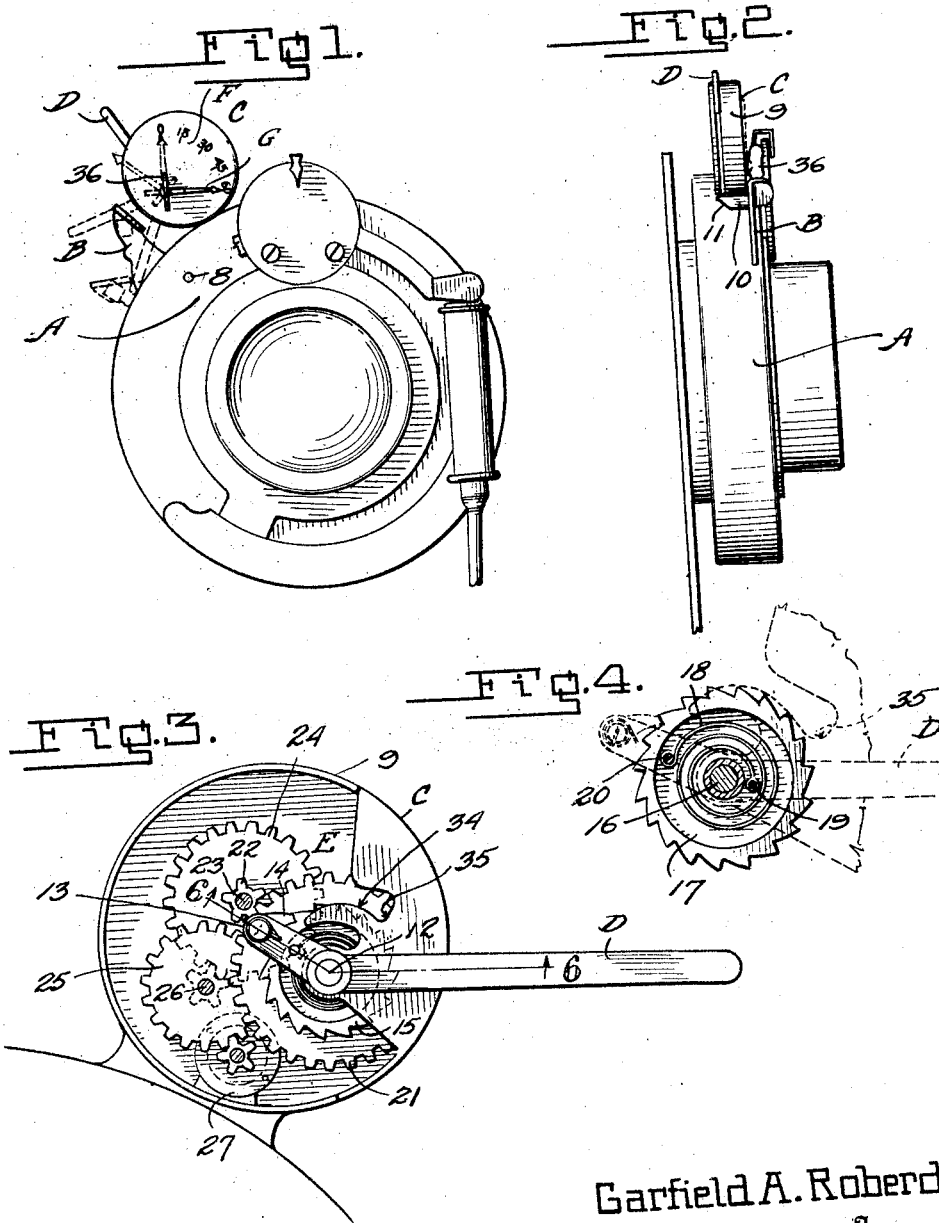

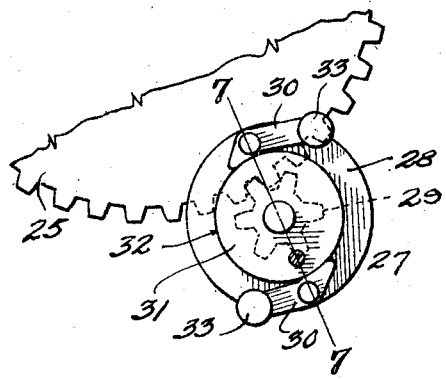
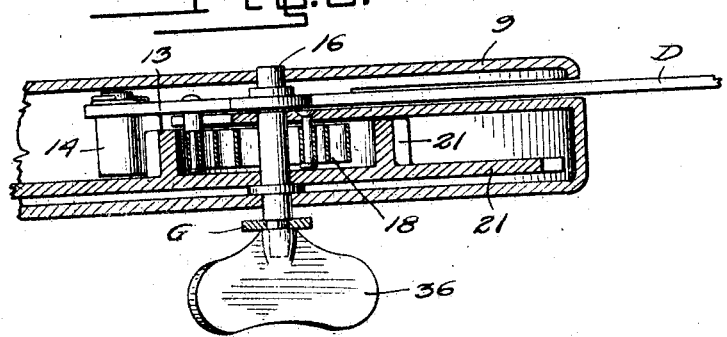
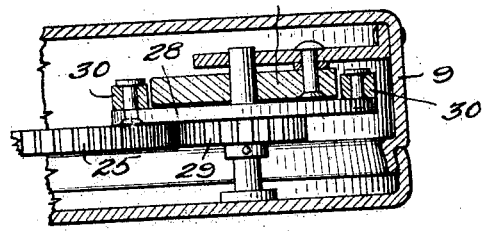

GARFIELD A. ROBERDS, OF OLATHE, KANSAS.

SHUTTER-OPERATING DEVICE.

1,381,241.  Specification of Letters Patent.  Patented June 14, 1921.

Application filed July 18, 1919. Serial No. 311,754.

*To all whom it may concern:*

Be it known that I, GARFIELD A. ROBERDS, a citizen of the United States, residing at Olathe, in the county of Johnson and State of Kansas, have invented certain new and useful Improvements in Shutter-Operating Devices, of which the following is a specification.

My present invention relates to cameras, and more particularly to an automatic shutter operating device therefor, by which a photograph may be taken without a person attending to the camera when the shutter is actuated for exposure of the sensitized plate or film. In use, devices of this kind disposed in operative relation to the usual shutter operating mechanism of cameras may be set in motion by a person who is given ample time to pose in front of the camera before exposure of the sensitized plate or film.

The principal objects of my invention are; first, to provide shutter operating devices which may be either attached to cameras already assembled or built as a part of cameras during manufacture and which are compact, simple in construction, and easily operated; second, to provide a shutter operating device embodying mechanism by which the duration of operation may be controlled thus enabling the operator to select a period of time between the starting of the mechanism and the actuating of the shutter operating mechanism, best adapted to prevailing conditions and adjust the mechanism accordingly; third, to provide in a shutter operating device, mechanism including a main spring which may be distorted so as to do work in its inherent tendency to resume a normal position and at the same time the mechanism set in operation for a predetermined duration by the same element, such as a lever or button; fourth, to provide in a shutter operating device, mechanism including a main spring which cannot be wound too tightly and which comes to rest with a minimum of tension thereon after each operation, so that the spring is not liable to become permanently set even after the device has been in use for a considerable length of time; fifth, to provide in a shutter operating device mechanism which may operate upon any approved type of shutter operating mechanism that is provided with a manually operated lever or tappet, to automatically operate the shutter mechanism, but which comes to rest in a manner that the photograph may be readily taken in the usual manner, that is, by manually operating the lever, tappet, bulb or other device, without first altering the position of the automatic device, or any part thereof; and, sixth, to provide in a shutter operating device mechanism including a train of gears and a governor for the duration of operation which enables the operator to set the mechanism into operation without first oscillating or otherwise vibrating the device as is necessary with an escapement such as that used in watches or clocks.

Other objects and advantages of the invention will appear in the following detailed description taken in connection with the accompanying drawings, forming a part of this specification, and in which drawings:

Figure 1 is a front elevation of an ordinary camera shutter operating mechanism, with an automatic operating device, constructed according to my invention applied thereto.

Fig. 2 is a side elevation of the same.

Fig. 3 is an enlarged view in rear elevation of the operating device.

Fig. 4 is a detail view of the main spring and parts associated therewith, some of the parts being shown in dotted lines to disclose details.

Fig. 5 is a detailed elevation of a governor for time controlled mechanism.

Fig. 6 is an enlarged sectional view on the line 6—6 of Fig. 3 looking in the direction of the arrows.

Fig. 7 is an enlarged sectional view on the line 7—7 and showing portions of a case adapted to accommodate the mechanism.

In the drawings, where similar characters refer to similar parts throughout the several views, A designates generally the camera shutter operating mechanism of any approved type, including a depressible operating member B, such as a lever adapted to be manually operated, C a device for automatically actuating said member and comprising a lever D, time controlled mechanism E for operating said lever D, and a dial F and an indicator G when desired.

It is not deemed necessary or desirable to show specifically the camera shutter operating mechanism A since the present invention is applicable to any and all types of shutter operating mechanism provided with a depressible operating mechanism such as B, in the example shown being in the form of a lever movable about the axle shown at 8 in Fig. 1.

By way of example the lever D, mechanism E, and associated elements may be supported by a casing 9 secured in any suitable manner to the camera, and disposed with the member B in the path of movement of the lever D, it being preferred to provide on the lever B, a lug 10 having an inclined cam surface 11, so that the lever D when moving in one direction will engage the said lug at a point opposite to said cam surface and ride off the lug after the member B has been depressed, permitting it to return to a normal position and under which conditions it is preferred to make the lever D of spring steel or its equivalent so that it will ride the cam surface 11 in its upward movement, shifting the lever D laterally past the lug.

The lever D is oscillatable about an axis indicated at 12 and is provided with an extension 13 carrying a spring actuated pawl 14 adapted to engage in the teeth of a ratchet wheel 15 concentric with the axis of rotation of the lever but freely movable on the spindle 16 of the lever. This ratchet wheel may be provided with a depression 17 to accommodate a coil spring 18 one end portion of which is secured, as by pin 19 to the housing 9, while the other end portion is secured to the extension 13 of lever D as by pin 20, the spring having a tendency to move the lever D in the direction indicated by arrow in Fig. 4 of the drawings.

The ratchet wheel 15 carries with it a gear wheel 21, co-meshing with a pinion 22, secured to an axle 23. This axle has secured thereto a gear wheel 24 which in turn imparts movement to a gear wheel 25 movable about axis 26, in the usual manner, a train of gears being provided so as to operate a governor 27 which retards movement of the lever D in the direction indicated by arrow in Fig. 4, responsive to the spring.

The governor, more clearly shown in Fig. 5 of the drawings comprises a wheel 28, rotated by gear wheel 25 as through pinion 29; centrifugally operated brakes 30 carried by wheel 28; and a member 31 carried by the casing 9, and rigid therewith providing a surface 32 for engagement with the brakes 30. Thus, if the axle 16 is rotated, so as to swing the lever G upwardly, the pawl 14 will ride over the teeth of ratchet wheel 15 and the spring 18 will be tensioned. When the axle 16 is released, movement will be imparted to the governor wheel 28 through the train of gears, the ratchet wheel 15, pawl 14 and lever extension 13, the weighted end portions 33 of the brake being thrown outwardly by centrifugal action, bringing the brakes into intimate contact with the member 31, which prevents racing of the train of gears. It is to be observed however, that it is not necessary to oscillate the device or otherwise vibrate it, in order to set the time controlled mechanism into operation, since there is little frictional engagement of the brake on the surface 32 of member 31, when the mechanism is at rest.

In a device of this kind it is desirable to quickly operate the lever D for there is a certain amount of resistance to be overcome, and in order to accomplish such a cam 34 is provided, rigid with housing 9 and so disposed that after the lever D has moved downwardly to a certain extent the pawl 14 which is relatively wider than the ratchet wheel 15 engages this cam surface 34 and is lifted from engagement with the tooth of the ratchet wheel 15 permitting the lever to move quickly responsive to spring 18, until the pawl 14 engages an abutment 35 of housing 9.

If desired, the housing 9 may be provided with the dial F having delineations, in the example shown, representing seconds and an indicator G which may be rigid with the axle 16, this indicator coöperating with the dial and a button 36 provided by which movement may be manually imparted to the axle 16 and hence to the lever D.

It is to be observed that the period of time it takes for the lever D to move downwardly and until it is released from operative relation to the ratchet wheel 15 depends upon the extent it is moved upwardly with the pawl 14 falling into engagement with one of the teeth of the ratchet wheel. In the example shown, if movement is imparted to the axle 16 through button 36 so as to move the indicator G to the delineation 15 on dial F, the pawl 14 will engage one of the teeth of ratchet wheel 15 adjacent to the cam surface 34, and hence the duration of time before the pawl is lifted from engagement with the teeth will be very short. However, if the axle is given, say, one fourth of a turn, the pawl 14 will ride over a number of the teeth of the ratchet wheel and engage with one remote from the cam surface 34, and hence a considerable length of time will elapse before the lever D is released to actuate the member B.

It is to be observed that there is a quick release of the lever D as it approaches the member B and that after it has depressed said member it rides off the lug 10, permitting the member B to return to the normal position. When the camera is next used it may be manually operated by the person pressing on member B in the usual manner or may be set for automatic operation by merely imparting movement to the button 36, the lever D in its upward movement riding past lug 10 as hereinbefore set forth. The lever D comes to rest out of the path of movement of member B and at which time the spring 18 is not under any great tension, hence it is not apt to become permanently set, even though the device may be used for a considerable length of time. It is also impossible for a person to wind the spring too tightly, since the lever D and hence the axle 16 is limited to oscillation and cannot make a complete revolution. There is merely one member of the the device which can be manually engaged and that is, in the example shown, the button 36 which is used to distort the spring so that it may do work in its inherent tendency to resume a normal position, reset the lever D and actuate the indicator G to the desired position with respect to dial F.

Changes in details may be made without departing from the spirit or scope of my invention; but,

I claim:

1. In combination with a camera shutter operating mechanism including an operating lever adapted to be manually operated, of a lug carried by said lever adjacent its free end portion and provided with a cam surface at one side, a lever movable in one direction to engage said lugs at a point opposite to said cam surface to actuate said first mentioned lever, and adapted to be guided past said first named lever by said cam surface in its movement in an opposite direction, and time controlled mechanism for actuating said lever in said first mentioned direction.

2. An actuating mechanism comprising a supporting structure having a slot therein, a lever pivoted in the supporting structure and extending through said slot, a tail piece on the lever extending beyond its fulcrum point, a pawl pivoted to the lever tail piece and extending laterally therebeyond, a ratchet wheel mounted to rotate in the supporting structure and having its teeth arranged to be engaged by said pawl, governing mechanism acting to retard the movement of said ratchet wheel, a volute spring within said ratchet wheel being connected to the tail piece of said lever and acting to swing said lever and tail piece in a predetermined direction about the lever fulcrum, a cam wall disposed in the path of said pawl and acting to lift the pawl out of engagement with the ratchet teeth as the lever approaches the end of its stroke, and a stop at the end of said cam wall adapted to be encountered by said pawl.

3. An actuating mechanism comprising a lever, a pawl carried thereby, a ratchet wheel turning about a center coinciding with the fulcrum of said lever and being free of the latter, a gear wheel fixed with said ratchet wheel, governing means acting on said gear means to retard the movement of the lever during the time the pawl is engaged with the ratchet wheel, a volute spring within the ratchet wheel for moving the lever in one direction, and a cam extending outwardly of the ratchet teeth and in the path of the pawl for shifting the latter out of engagement with the ratchet teeth as the lever approaches the end of its movement, said cam provided with a stop encountered by the pawl to arrest the movement of the lever.

GARFIELD A. ROBERDS.